United States Patent [19]

Rifi

[11] Patent Number: 4,593,075
[45] Date of Patent: Jun. 3, 1986

[54] PREPARATION OF ELASTOMERIC, CHLORINATED ETHYLENE POLYMERS

[75] Inventor: Mahmoud R. Rifi, Kendall Park, N.J.

[73] Assignee: Union Carbide Corporation, Danbury CT

[21] Appl. No.: 608,875

[22] Filed: May 14, 1984

Related U.S. Application Data

[63] Continuation-in-part of Ser. No. 514,337, Jul. 15, 1983, abandoned.

[51] Int. Cl.$^4$ ................................................ C08F 8/22
[52] U.S. Cl. .................................. 525/356; 525/334.1
[58] Field of Search ................... 525/333.7, 334.1, 355, 525/356

[56] References Cited

U.S. PATENT DOCUMENTS

| | | | |
|---|---|---|---|
| 2,890,213 | 6/1959 | Noeske | 525/356 |
| 2,913,449 | 11/1959 | Hoerger | 525/356 |
| 2,928,819 | 3/1960 | Noeske | 525/356 |
| 2,964,509 | 12/1960 | Hurt | 525/356 |
| 3,033,845 | 5/1962 | Scott | 525/356 |
| 3,206,444 | 9/1965 | Gumboldt | 525/344 |
| 3,347,835 | 10/1967 | Lorenz | 525/344 |
| 3,542,746 | 11/1970 | Eckardt et al. | 525/344 |
| 3,624,054 | 11/1971 | Barton et al. | 525/344 |
| 3,770,706 | 11/1973 | Walles | 525/344 |
| 4,011,379 | 3/1977 | Bow et al. | |
| 4,029,850 | 6/1977 | Ishii et al. | 428/518 |
| 4,029,862 | 6/1977 | Liu et al. | 525/356 |
| 4,144,289 | 3/1979 | Watanabe et al. | |
| 4,220,739 | 9/1980 | Walles | 525/344 |
| 4,425,206 | 1/1984 | Hutchinson | 525/356 |
| 4,452,953 | 1/1984 | Benedikt | 525/344 |
| 4,547,554 | 10/1985 | Kadomatsu et al. | 525/334.1 |

FOREIGN PATENT DOCUMENTS 1385778  2/1975  United Kingdom .

*Primary Examiner*—Christopher A. Henderson
*Attorney, Agent, or Firm*—James C. Arvantes; Robert C. Brown

[57] ABSTRACT

A process of modifying ethylene polymers by reacting granular ethylene polymers having a density of about 0.87 to about 0.92 gram per cc and a pore volume of about 0.1 to about 1 cc per gram with a gaseous chlorinating agent to produce elastomeric, granular, chlorinated polymers having a tensile modulus of less than about 2,000 psi and a crystallinity of less than about 10 percent.

5 Claims, No Drawings

PREPARATION OF ELASTOMERIC, CHLORINATED ETHYLENE POLYMERS

This application is a continuation-in-part of my application, Ser. No. 514,337, filed July 15, 1983, now abandoned.

SUMMARY OF THE INVENTION

This invention relates to the modification of ethylene polymers by reacting, in the absence of solvent or diluent, a granular ethylene polymer, having a density of about 0.87 to about 0.92 gram per cc and a pore volume of about 0.1 to about 1 cc per gram with a gaseous chlorinating agent to produce an elastomeric, granular, chlorinated polymer having a tensile modulus of less than about 2,000 psi and a crystallinity of less than about 10 percent. The elastomeric polymers so produced can be cured to crosslinked products which are useful in the production of film material, as extrudates about wires and cables, as the base polymers in flame retardant compositions and as plasticizers for polyvinyl chloride polymers.

BACKGROUND OF THE INVENTION

Elastomeric, chlorinated ethylene polymers are commercially attractive, as once cured to crosslinked products, they are characterized by a number of desirable properties, including (a) resistance to chemical solvents (b) resistance to ozone (c) resistance to abrasion (d) resistance to outdoor weathering and (e) by excellent use temperatures, i.e. flexibility over a temperature range of about $-20°$ C. to about $120°$ C. Consequently, cured chlorinated ethylene polymers and compositions based thereon, characterized by the properties described above, find uses in many diverse applications including production of film material, as extrudates about wires and cables, as base polymers in flame retardant compositions and as plasticizers for polyvinylchloride polymers.

The preparation of chlorinated ethylene polymers has been carried out, in the past, by a solution process wherein the polymers have been reacted with a chlorinating agent, while in a solvent medium. The so-called solution process requires that the solvent be removed from the chlorinated polymers at the completion of the reaction, generally by heating the reacted system at temperatures sufficiently high to drive off the solvent. At the temperatures employed for solvent removal, however, the chlorinated polymers tend to agglomerate and become difficult to handle and process.

DESCRIPTION OF THE INVENTION

The present invention provides for the chlorination of ethylene polymers by a process which avoids the use of solvents and diluents and their attendant disadvantages and results in the production of granular, elastomeric ethylene polymers which have been homogeneously chlorinated, as evidenced by an excellent balance of properties. Also, by reason of their granular nature, the chlorinated ethylene polymers of this invention are easy to handle and process.

The results of the present invention are achieved by reacting, in the absence of diluents and/or solvents, a gaseous chlorinating agent with a granular ethylene polymer having a density of about 0.87 to about 0.92 gram per cc, preferably a density of about 0.89 to about 0.91 gram per cc and a pore volume of about 0.1 to about 1 cc per gram, generally about 0.1 to about 0.5 cc per gram and preferably about 0.2 to about 0.4 cc per gram to produce a granular, elastomeric, chlorinated polymer, that is a chlorinated polymer having a tensile modulus of less than about 2,000 psi and a crystallinity of less than about 10 percent.

The chlorinated ethylene polymers so produced, being homogeneously chlorinated and "elastomeric" are characterized by an excellent balance of properties, comparable to commercially available, chlorinated ethylene polymers prepared in an aqueous dispersion.

Ethylene polymers suitable for purposes of the present invention, having the density and pore volume previously described, are ethylene-$C_3$ to $C_8$ alpha olefin polymers produced by reacting ethylene with at least one alpha monoolefin under low pressures as further described in U.S. Pat. No. 4,302,565 to George L. Goeke et al patented Nov. 24, 1981, and in pending application Ser. No. 480,296 filed Mar. 29, 1983 assigned to a common assignee.

Particularly desirable ethylene polymers for purposes of the present invention have the density and pore volume described and contain about 50 to about 99 and preferably about 75 to about 96 mole percent ethylene; and about 1 to about 50, preferably about 4 to about 25 mole percent of at least one $C_3$ to $C_8$ alpha monoolefin such as propylene, butene-1, pentene-1,4-methylpentene-1, hexene-1, heptene-1 and octene-1.

Even more desirable ethylene polymers to be chlorinated according to the present invention have:

an average particle size of about 200 to about 1,500, preferably about 300 to about 1,000 microns, a bulk density of about 10 to about 30, preferably about 15 to about 24, a pore volume (porosity) of about 0.1 to about 1, generally about 0.1 to about 0.5, and preferably about 0.2 to about 0.4, cc/gm, and a density of about 0.87 to about 0.92, preferably about 0.89 to about 0.91, gram/cc.

The time of treatment with gaseous chlorinating agent is sufficient to obtain a chlorinated ethylene polymer having a tensile modulus of less than about 2,000 psi and a crystallinity of less than about 10 percent, preferably a crystallinity of 0 to about 5 percent and generally having a total chlorine content of about 5 to about 55 percent by weight, preferably about 15 to about 40 percent by weight.

This treatment is believed to result in the replacement of hydrogen atoms on the backbone of the ethylene polymers with Cl groups.

The actual time of treatment generally varies from about 3 to about 10 hours, depending upon the particular ethylene polymer being chlorinated, the chlorinating agent being used and the temperature and pressure being employed.

Generally, suitable temperatures are in the range of about $50°$ C. to about $130°$ C., preferably about $50°$ C. to about $100°$ C. The pressure under which the reaction is conducted can range from atmospheric pressure to a pressure of about 1,000 psi, provided that none of the reactants or by-products condense under the reaction conditions employed. As a rule, the higher the temperature and pressure, the shorter the reaction time.

In carrying out the reaction, the amount of chlorinating agent used is about 10 to about 200 percent by weight, preferably about 20 to about 100 percent by weight based on the weight of the ethylene polymer being treated.

If desired, an inert gas such as nitrogen may be used in conjunction with the gaseous modifying agent, serving as a fluidizing agent, a diffusion aid and/or as a heat sink.

The properties noted herein were determined by the following test methods:

| | |
|---|---|
| Density (gram/cc) | ASTM-D-1505 - A plaque was made and conditioned for one hour at 100° C. to approach equilibrium crystallinity. Measurement for density was then made in a density gradient column. |
| Pore Volume (cc/gram) | ASTM C-699-108 (45) |
| Average Particle Size (microns) | Calculated from sieve analysis data measured according to ASTM-D-1921 Method A, using a 500 gram sample. Calculations were based on weight fractions retained on the screens. |
| Bulk Density | Polymer was poured via ⅜ diameter funnel into a 100 ml. graduated cylinder to the 100 ml. line without shaking the cylinder. Bulk density was determined based on the difference in weight between the unfilled cylinder and the filled cylinder. |
| Crystallinity (percent) | Measured by Differential Scanning Calorimeter (DSC) using a duPont-990 analyzer with a pressure DSC cell. |
| Tensile Modulus (psi) | A film, 4 inches by 4 inches by 0.020 inch, was compression molded at a temperature of 130° C.–150° C. and its one percent secant modulus measured according to ASTM-D-638. |
| Tensile Strength (psi) | A film, prepared as described for the Tensile Modulus Test, was tested according to ASTM-D-638. |
| Percent Elongation at Break | A film, prepared as described for the Tensile Modulus Test, was tested according to ASTM-D-638. |

The following Examples are provided to illustrate the present invention and are not intended to limit the scope thereof.

Unless otherwise indicated, the ethylene polymers used as the starting materials in the Examples were prepared by the process disclosed in pending U.S. application Ser. No. 480,296, filed Mar. 29, 1983, assigned to a common assignee, the disclosure of which is incorporated herein by reference.

Apparatus/Process

The ethylene polymers were chlorinated in a two liter glass lined stainless steel or Hastelloy (55% Ni, 17% Mo, 16% Cr, 6% Fe and 4% W) reactor equipped with a thermocouple and a motor activated U-shaped Hastelloy stirrer.

A Hastelloy dip tube (~2 cm in diameter) was used to feed the gaseous modifying agent into the reactor. Unreacted modifying agent and HCl were vented to a collection trap containing 25 percent aqueous NaOH. The gaseous modifying agent was fed at the rate of 8 to 15 grams/hour for $Cl_2$ under a pressure of about 15 to about 450 psi. The polymer to be treated, about 200 to about 1,000 grams, was charged to the reactor and heated therein by an external heater. No catalysts were used in carrying out these examples.

After the polymer was added to the reactor and heated to the desired reaction temperature, the polymer was agitated by the stirrer and the gaseous modifying agent was fed in. During the course of the modifying process, samples of the modified polymers were taken from the reactor and tested for chlorine content and percent crystallinity. At the completion of the reaction, the flow of gaseous modifying agent was terminated and the product was allowed to cool in the reactor while the reaction vessel was purged with nitrogen to remove unreacted $Cl_2$ and HCl by-product.

Three granular, low density ethylene-butene-1 copolymers, A, B and Control 1, having the properties noted below, were chlorinated with gaseous chlorine.

| | Control 1 | A | B |
|---|---|---|---|
| Density, gm/cc | 0.926 | 0.918 | 0.875 |
| Mole, percent butene-1 in copolymer | 2.4 | 3.8 | 20 |
| Crystallinity, percent | 50 | 44 | 13 |
| Particle size, microns (average) | 400 | 500 | 400 |
| Porosity, cc/gm | 0.3 | 0.35 | 0.37 |
| Bulk Density | 27 | 26 | 21 |
| Tensile Modulus, psi | 45,300 | 36,300 | 1,160 |
| Tensile Strength, psi | 2,190 | 3,540 | 290 |
| Elongation, percent | 460 | 983 | 920 |

The ethylene-butene-1 copolymers were chlorinated by reaction with gaseous $Cl_2$ for about 8 to 14 hours at a temperature of 70° C. to 80° C. for Control 1 and Polymer A and at a temperature of 60° C. for Polymer B, to produce chlorinated polymers having properties set forth in Table I.

TABLE I

| | Control 1 | Control 2* | Example 1 | Example 2 |
|---|---|---|---|---|
| Chlorine, percent | 24 | 36 | 33 | 20 |
| Crystallinity, percent | 5 | 7.2 | 2.8 | 6.5 |
| Tensile Modulus, psi | 2,730 | 930 | 650 | 370 |
| Tensile Strength, psi | 660 | 1,110 | 590 | 218 |
| Elongation, percent | 930 | 763 | 900 | 1,300 |

*Commercial chlorinated polyethylene available from Dow Chemical Co.

The chlorinated polymer of Control 1 was not elastomeric as evidenced by its "high" modulus. Also, data indicate that the elastomers produced in accordance with this invention have properties comparable to a commercially available chlorinated polymer.

In order to further demonstrate the necessity of utilizing an ethylene polymer having the density and pore volume previously described, Control 3 was carried out using a granular ethylene homopolymer having the following properties:

| | |
|---|---|
| Density, gm/cc | 0.968 |
| Crystallinity, percent | 89 |
| Particle size, microns (average) | 0.3 |
| Pore Volume, cc/gm | 0.3 |
| Bulk Density | 27 |

This polymer was chlorinated with gaseous chlorine at a temperature of 85° C. to 90° C. to produce a chlorinated polymer having the properties set forth below.

| | Starting Polymer | Intermediate Product | Final Product |
|---|---|---|---|
| Chlorine, percent by weight | 0 | 15 | 40 (after 30 hrs) |
| Crystallinity, | 89 | 62 | 35 |

|  | Starting Polymer | Intermediate Product | Final Product |
| --- | --- | --- | --- |
| percent | | | |
| Tensile Modulus, psi | 139,000 | 94,700 | 170,000 |
| Tensile Strength, psi | 3,470 | 1,900 | 3,270 |
| Elongation at break, percent | 420 | 13 | 2.7 |

The data of Control 3 indicate that even though the chlorinated polymer had a relatively high chlorine content, it was not elastomeric.

Control 4 was carried out using a granular ethylenebutene-1 copolymer having the following properties:

| Density, gm/cc | 0.935 |
| --- | --- |
| Mole % butene-1 in copolymer | 1.5 |
| Crystallinity, percent | 56.5 |
| Particle size, microns (average) | 500 |
| Pore Volume, cc/gm | 0.35 |
| Bulk Density | 26 |

This copolymer was chlorinated with gaseous chlorine at a temperature of 90° C. to produce a chlorinated polymer having the properties set forth below.

|  | Starting Polymer | Intermediate Products | | | Final Product |
| --- | --- | --- | --- | --- | --- |
| Chlorine, percent by weight | 0 | 11 | 17 | 25 | 30 |
| Crystallinity, percent | 56.5 | 32 | 32 | 34 | 29 |
| Tensile Modulus, psi | 61,600 | 20,200 | 37,100 | 57,100 | 83,900 |
| Tensile Strength, psi | 2,670 | 1,900 | 1,980 | 2,810 | 2,720 |
| Elongation at break, percent | 85 | 75 | 36 | 52 | 19 |

The data of Control 4 indicate that even though the chlorinated polymer had a relatively high chlorine content, it was not elastomeric.

The polymers of Controls 1,3,4 and polymer A were prepared according to the process disclosed in U.S. Pat. No. 4,302,565.

Chlorinated ethylene polymers of this invention can be peroxide cured to crosslinked products using peroxides such as di-α-cumyl peroxide as is well known in the art.

What is claimed is:

1. A process which comprises reacting, at a temperature of about 50° C. to about 130° C. and for a period of about 3 to about 10 hours, an ethylene-butene-1 copolymer having a density of about 0.875 to about 0.918 and a pore volume of about 0.1 to about 1 cc per gram with a gaseous chlorinating agent to produce an elastomeric, granular, chlorinated polymer having a tensile modulus of less than about 2,000 psi and a crystallinity of less than about 10 percent.

2. A process as defined in claim 1 wherein the ethylene-butene-1 copolymer has a pore volume of about 0.1 to about 0.5 cc per gram.

3. A process as defined in claim 1 wherein said polymer has a density of about 0.89 to about 0.91 gram per cc and a pore volume of about 0.2 to about 0.4 cc per gram.

4. A process as defined in claim 1 wherein the chlorinating agent is gaseous chlorine.

5. A process as defined in claim 1 wherein the ethylene polymer has the following properties:
   an average particle size of about 200 to about 1,500,
   a bulk density of about 10 to about 30,
   a pore volume of about 0.1 to about 1, and
   a density of about 0.87 to about 0.92.

* * * * *